(12) United States Patent
Travis et al.

(10) Patent No.: US 10,683,936 B2
(45) Date of Patent: Jun. 16, 2020

(54) MODULAR SEALING ELEMENTS FOR A BEARING ASSEMBLY

(71) Applicant: REFORM ENERGY SERVICES CORP., Leduc (CA)

(72) Inventors: Kenneth Travis, Blackfalds (CA); Lyle Filliol, Blackfalds (CA); Stewart Wilson, Blackfalds (CA)

(73) Assignee: Reform Energy Services Corp., Leduc (CA)

( * ) Notice: Subject to any disclaimer, the term of this patent is extended or adjusted under 35 U.S.C. 154(b) by 246 days.

(21) Appl. No.: 15/111,446

(22) PCT Filed: Jan. 13, 2015

(86) PCT No.: PCT/CA2015/050019
§ 371 (c)(1),
(2) Date: Jul. 13, 2016

(87) PCT Pub. No.: WO2015/106351
PCT Pub. Date: Jul. 23, 2015

(65) Prior Publication Data
US 2016/0334018 A1 Nov. 17, 2016

(30) Foreign Application Priority Data
Jan. 14, 2014 (CA) ...................................... 2839151

(51) Int. Cl.
*F16J 15/3268* (2016.01)
*E21B 33/08* (2006.01)
(Continued)

(52) U.S. Cl.
CPC ........... *F16J 15/3268* (2013.01); *E21B 33/08* (2013.01); *E21B 33/085* (2013.01); *F16J 15/002* (2013.01); *E21B 33/06* (2013.01); *F16J 15/3232* (2013.01)

(58) Field of Classification Search
CPC ....... E21B 33/06; E21B 33/085; F16J 15/002; F16J 15/3232; F16J 15/3268
(Continued)

(56) References Cited

U.S. PATENT DOCUMENTS 2,222,082 A * 11/1940 Leman .................. E21B 33/085
15/220.1
3,216,731 A * 11/1965 Dollison ................. E21B 33/06
166/387

(Continued)

OTHER PUBLICATIONS

Extended European Search Report dated Sep. 25, 2017, issued in corresponding European Application No. 15736963.8, filed Jan. 13, 2015, 9 pages.

(Continued)

*Primary Examiner* — Nicholas L Foster
(74) *Attorney, Agent, or Firm* — Christensen O'Connor Johnson Kindness PLLC

(57) ABSTRACT

There is provided a sealing assembly for a bearing assembly that supports a rotating tubing string that extends through the riser. The sealing assembly has a plurality of sealing elements. Each sealing element has a seal body having an inner sealing surface designed to seal against a tubular body. The sealing assembly also has one or more sleeves that removably attach between adjacent sealing elements. Adjacent sealing elements are attached to the one or more sleeves in axial alignment. A chamber is formed by the adjacent sealing elements and the corresponding sleeve. The sealing assembly further has a bearing attachment for attaching the plurality of modular sealing elements to a rotating portion of the bearing assembly such that the sealing elements extend downward in series from the bearing assembly and rotate with the rotating tubing string.

11 Claims, 4 Drawing Sheets

(51) Int. Cl.
*F16J 15/00* (2006.01)
*F16J 15/3232* (2016.01)
*E21B 33/06* (2006.01)

(58) Field of Classification Search
USPC .................. 277/322, 324, 326, 343, 342
See application file for complete search history.

(56) References Cited

U.S. PATENT DOCUMENTS

| | | | |
|---|---|---|---|
| 3,387,851 A | 6/1968 | Cugini | |
| 3,868,832 A * | 3/1975 | Biffle | E21B 21/01 175/84 |
| 3,965,987 A * | 6/1976 | Biffle | E21B 21/01 166/379 |
| 5,213,158 A * | 5/1993 | Bailey | E21B 33/085 166/84.3 |
| 5,647,444 A * | 7/1997 | Williams | E21B 33/085 166/84.1 |
| 7,159,669 B2 * | 1/2007 | Bourgoyne | E21B 21/001 166/382 |
| 7,258,171 B2 * | 8/2007 | Bourgoyne | E21B 21/001 166/382 |
| 7,798,210 B1 * | 9/2010 | Pruitt | E21B 33/085 166/84.1 |
| 7,802,635 B2 * | 9/2010 | Leduc | E21B 21/08 166/113 |
| 7,836,946 B2 * | 11/2010 | Bailey | E21B 33/085 166/84.2 |
| 7,870,896 B1 | 1/2011 | Pruitt et al. | |
| 7,950,474 B2 * | 5/2011 | Leduc | E21B 21/08 166/113 |
| 8,322,432 B2 * | 12/2012 | Bailey | E21B 33/085 166/338 |
| 8,770,297 B2 * | 7/2014 | Bailey | E21B 33/085 166/338 |
| 8,820,747 B2 * | 9/2014 | Zubia | E21B 33/085 277/322 |
| 9,175,542 B2 * | 11/2015 | Bailey | E21B 21/015 |
| 9,441,445 B1 * | 9/2016 | Pruitt | E21B 33/085 |
| 2006/0037782 A1 * | 2/2006 | Martin-Marshall | E21B 33/085 175/40 |
| 2009/0152006 A1 * | 6/2009 | Leduc | E21B 21/08 175/48 |
| 2010/0175882 A1 * | 7/2010 | Bailey | E21B 33/085 166/335 |
| 2010/0269570 A1 * | 10/2010 | Leduc | E21B 21/08 73/40.5 R |
| 2011/0024195 A1 | 2/2011 | Hoyer et al. | |
| 2011/0315404 A1 | 12/2011 | Bailey et al. | |
| 2012/0000664 A1 | 1/2012 | Nas et al. | |
| 2012/0043726 A1 | 2/2012 | Zubia et al. | |
| 2012/0073113 A1 | 3/2012 | Leduc et al. | |
| 2012/0318496 A1 * | 12/2012 | Bailey | E21B 33/085 166/84.3 |
| 2014/0027129 A1 * | 1/2014 | Hannegan | E21B 33/085 166/387 |
| 2016/0341316 A1 * | 11/2016 | Baumann | F16J 15/3232 |

OTHER PUBLICATIONS

Singapore Search Report and Written Opinion dated Aug. 4, 2017, issued in corresponding Singapore Application No. 11201605764U, filed Jan. 13, 2015, 118 pages.
International Search Report with Written Opinion dated May 1, 2015, issued in corresponding International Application No. PCT/CA2015/050019, filed Jan. 13, 2015, 8 pages.
European Office Action dated Jun. 19, 2018, issued in corresponding European Application No. EP 15736963.8, filed Jan. 13, 2015, 9 pages.
Written Opinion dated Jun. 20, 2018, issued in corresponding Singapore Application No. 11201605764U, filed Jan. 13, 2015, 6 pages.

* cited by examiner

MODULAR SEALING ELEMENTS FOR A BEARING ASSEMBLY

TECHNICAL FIELD

This relates to modular sealing elements for a bearing assembly that may be used with a subsea hydrocarbon producing well.

BACKGROUND

In order to seal around a drill pipe or other tubular body in a subsea location, sealing elements are provided and are generally mounted to a bearing assembly. U.S. Pat. No. 6,244,359 (Bridges et al.) entitled "Subsea diverter and rotating drilling head" describes an example of a bearing and seal assembly for a subsea drilling head.

SUMMARY

According to an aspect, there is provided a sealing assembly for a bearing assembly, the bearing assembly having a fixed portion attached to a riser of a subsea wellhead and rotating portion attached to a rotating tubing string that extends through the riser. The sealing assembly comprises a plurality of sealing elements, and each sealing element comprises a seal body having an inner sealing surface designed to seal against a tubular body. The sealing assembly comprises one or more sleeves that removably attach between adjacent sealing elements, the adjacent sealing elements being to the one or more sleeves in axial alignment. A chamber is formed by the adjacent sealing elements and the corresponding sleeve. There is a bearing attachment for attaching the plurality of modular sealing elements to a rotating portion of the bearing assembly such that the sealing elements extend downward in series from the bearing assembly and rotate with the rotating tubing string.

According to another aspect, the sealing element may have a first end and a second end, and the first end may be attached to the sealing sleeve and the inner sealing surface may be positioned toward the second end.

According to another aspect, each sealing element may define an inner sealing diameter.

According to another aspect, there may be at least one sealing element with a different inner sealing diameter than another sealing element.

According to another aspect, the one or more sleeves may comprise connection seals at each of the first and second ends.

According to another aspect, each sleeve may attach to a first end of the sealing elements, such that an upper sealing element extends into the chamber.

According to another aspect, the inner sealing surface may be positioned toward a second end of the sealing element.

According to another aspect, the one or more attachment sleeves have first and second ends and the first end may be sized to nest with adjacent sleeves such that each of the first and second ends may be simultaneously attached to a respective sealing element.

According to another aspect, the sealing assembly may further comprise a cap ring that may engage the second end of the attachment sleeve at the end of the series of sealing elements.

According to another aspect, each sealing element may comprise a rigid attachment portion for attaching to the sleeve and an elastomeric sealing portion that may be carried by the attachment portion.

According to another aspect, the sealing assembly may further comprise at least one sensor for sensing at least one of the pressure and the temperature within at least one chamber. The sensor may transmit the readings wirelessly.

According to another aspect, each sealing element may carry a sensor for sensing at least one of pressure and temperature. The sensors may transmit the readings wirelessly.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
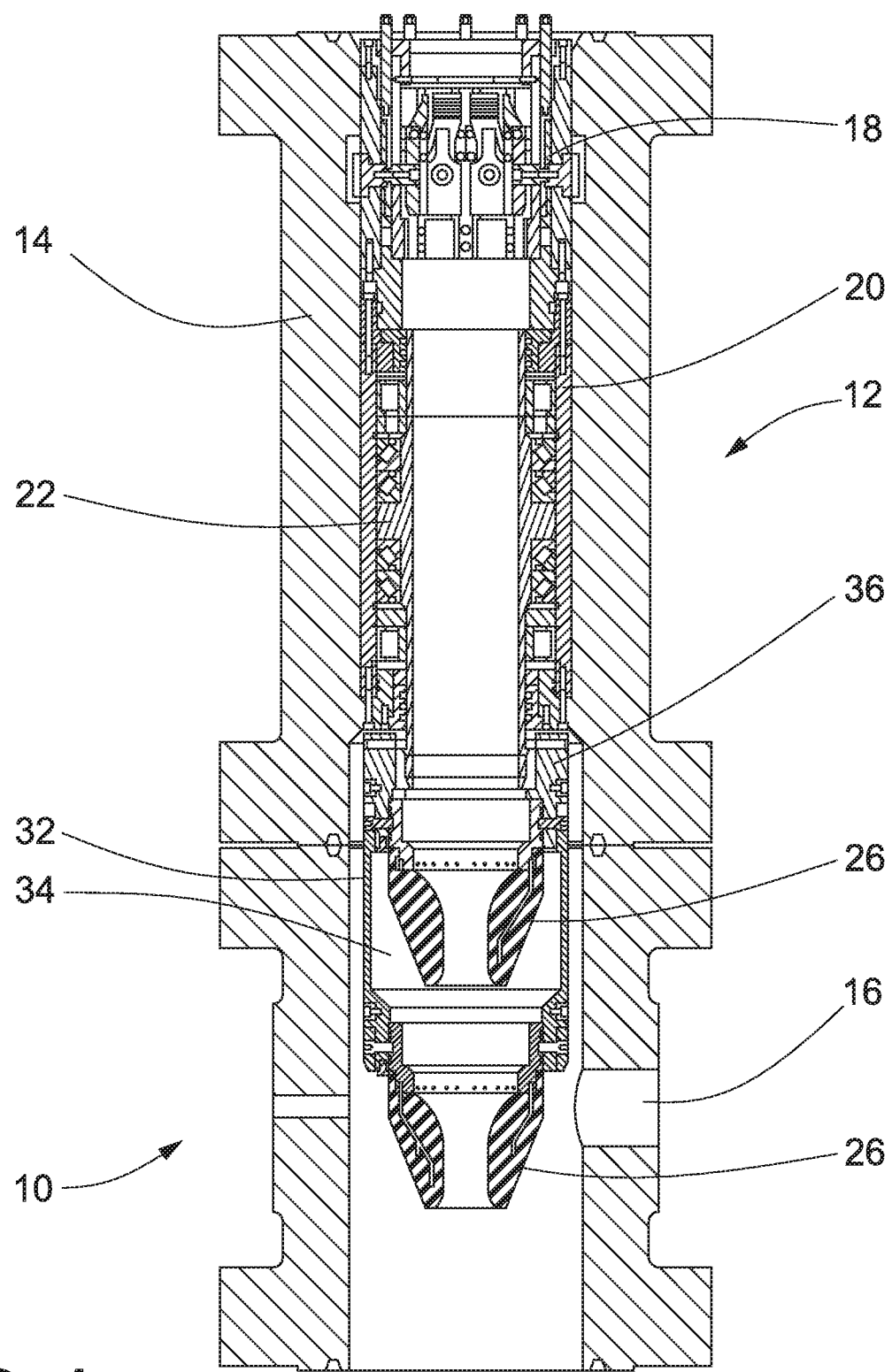
FIG. 1 is a side elevation view in section of a latching assembly securing a bearing assembly and element module assembly in a riser.

A modular sealing assembly generally identified by reference numeral 10, will now be described with reference to FIG. 1 through 4.

Figure 3:
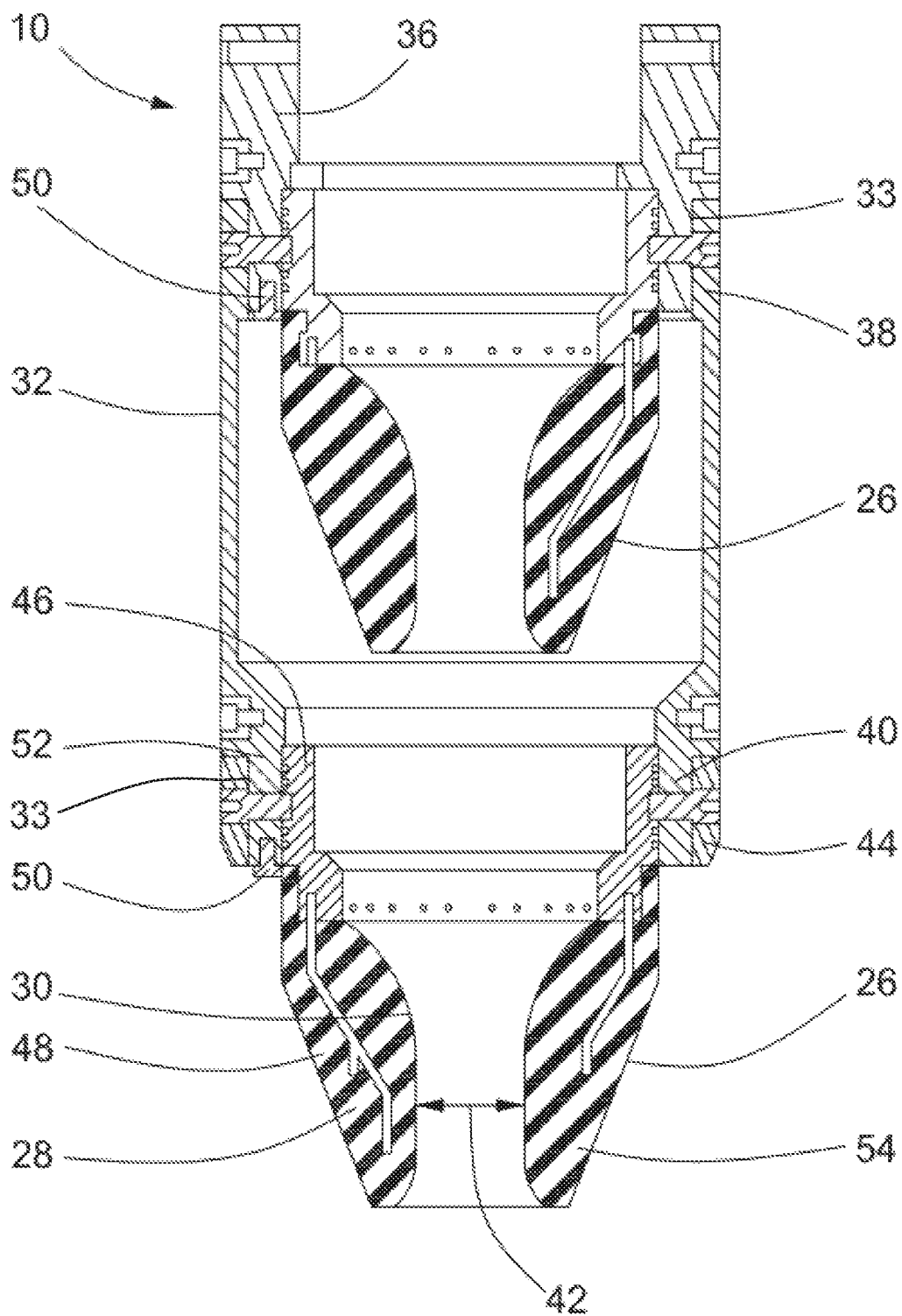
FIG. 3 is a side elevation view in section of a modular sealing element assembly.
Figure 4:
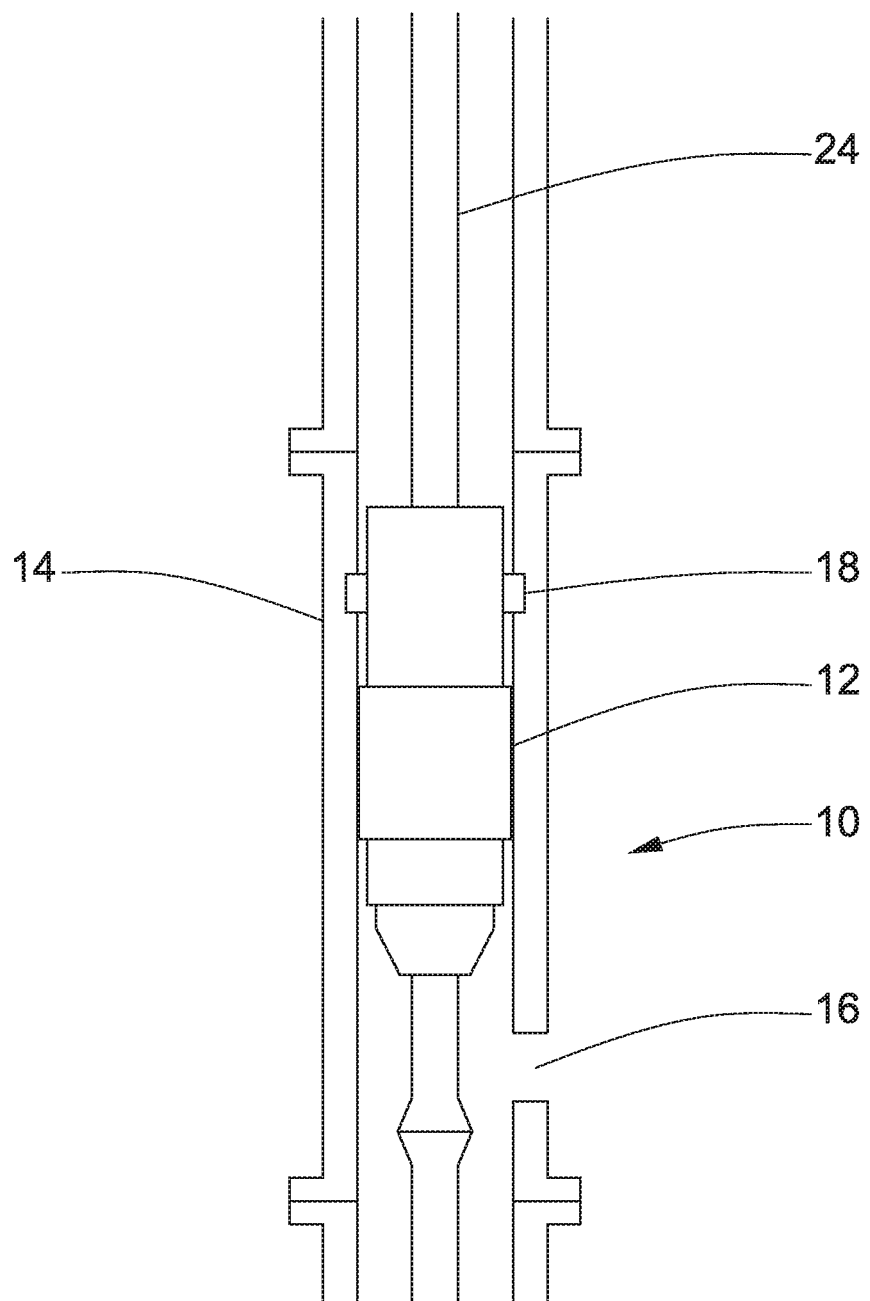
FIG. 4 is a side elevation view of a latching assembly securing a bearing assembly and element module assembly in a riser.

Referring to FIG. 4, sealing assembly 10 is attached to a bearing assembly 12 that is supported within a riser 14 of a subsea wellhead by a latch assembly 18. Referring to FIG. 1, the bearing assembly 12 has a non-rotating portion 20 seated in riser 14. Riser 14 has a port 16 for pumping fluids. Port 16 is designed to be attached to a conduit (not shown) for pumping fluids, such as drilling mud out from the wellbore. As shown, bearing assembly 12 is supported within riser 14 by a latch 18. Bearing assembly 12 may be supported within riser 14 in various ways as will be recognized by those skilled in the art, however the particular latch 18 that is depicted in the drawings is described in PCT application no. CA2013/050692. The bearing assembly 12 also has a rotating portion 22 that attaches to a rotating tubing string 24 (shown in FIG. 4) that extends through the riser 14. As shown, the rotating tubing string 24 enters the bearing assembly 12 and the sealing assembly 10. The rotating tubing string 24 enters a plurality of sealing elements 26, and the seal element body 28 seals about the rotating tubing string 24 at inner sealing surface 30 (shown in FIG. 3). The bearing assembly 12 allows the sealing elements 26 to rotate with the rotating tubing string 24.

Figure 2:
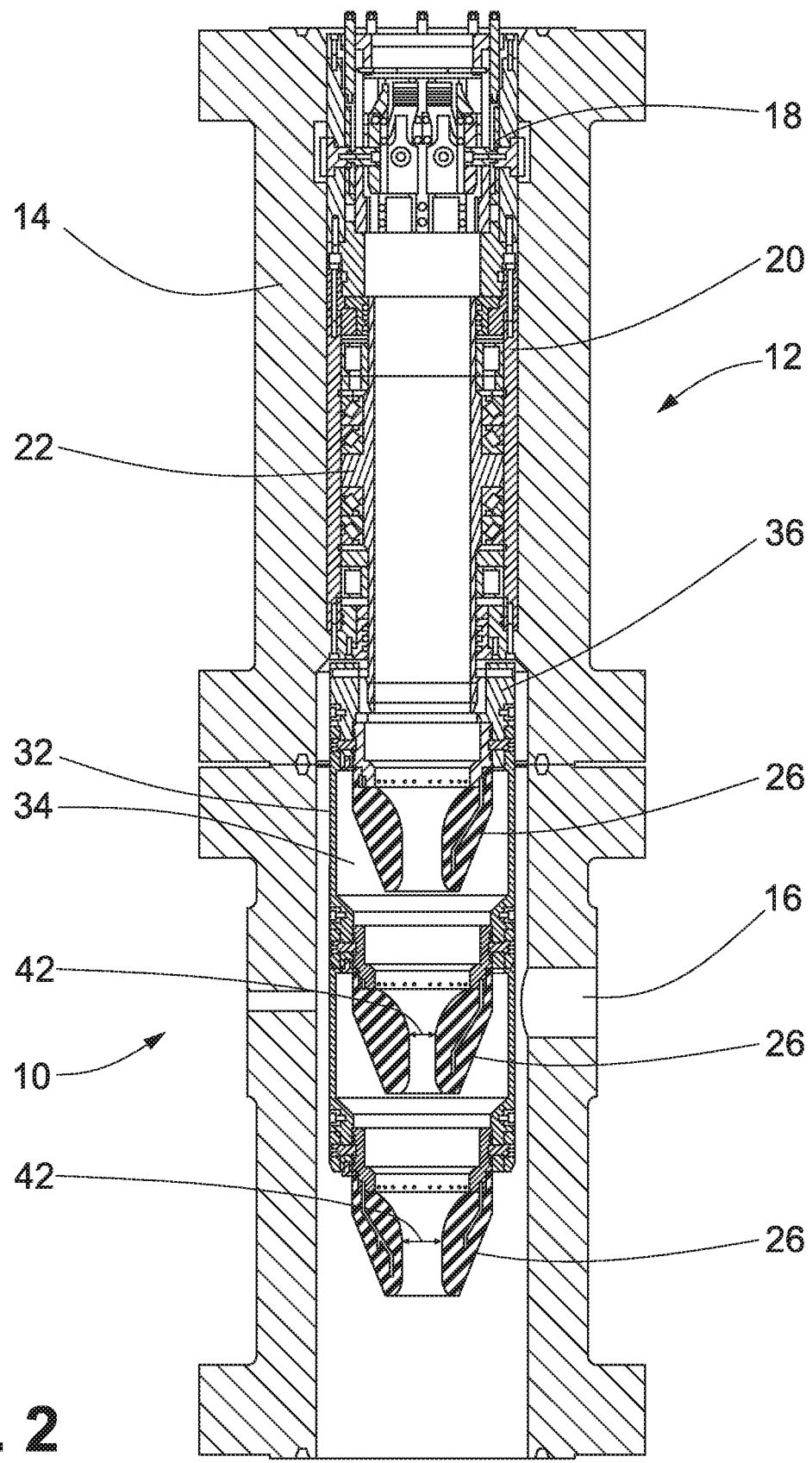
FIG. 2 is a side elevation view in section of a latching assembly securing a bearing assembly in a riser showing three modular sealing elements with different sized openings.

Sealing assembly 10 is made up of a plurality of sealing elements 26 that are designed to be modular. This allows them to be attached together in a stack of a desired configuration. Each sealing element 26 has a seal body 28 (showing in FIG. 3) *with* an inner sealing surface 30 designed to seal against a tubular body, such as rotating tubing string 24, shown in FIG. 4. Referring again to FIG. 1, adjacent sealing elements 26 are removably attached by sleeves 32. Referring to FIGS. 2 and 3, each sleeve 32 has a first end 38 and a second end 40. Each second end 40 is design to be attached to a seal element 26. This results in more than one seal element 26 attached in series below bearing assembly 12. Sleeve 32 maintains adjacent sealing elements 26 in axial alignment and forms a chamber 34 between the adjacent sealing elements 26. Sleeve 32 preferably includes seals 33 at each of first and second ends 38 and 40 to seal chamber 34. Sleeves 32 with first 38 and second 40 ends may be sized such that they nest with adjacent sleeves 32 such that each of the first 38 and second 40 ends are simultaneously attached to the sealing element 26.

Referring to FIG. 3, in the depicted embodiment, the sealing element 26 has the sleeve 32 attached to a first end 38 of the sealing element 26 above, such that the upper sealing element 26 extends down into the chamber 34. In this case, the inner sealing surface 30 is positioned toward a second end 40 of the sealing element 26. As shown, the sealing element 26 defines an inner sealing diameter 42. In the preferred embodiment, sleeve 32 further comprises a cap ring that engages the end of the attachment sleeve 32 and the second end 40 of the sealing element 26, such that it finishes the series of sealing elements 26 at the end of the sealing assembly 10. Each sealing element 26 may comprise a rigid attachment portion 46 in the region of the first end 52 of the sealing element 26 for attaching to the sleeve 32, and an elastomeric sealing portion 48 in the region of the second end 54 of the sealing element 26 defining the inner sealing surface 30, and the elastomeric sealing portion 48 is carried by the rigid attachment portion 46. The sealing assembly 10 is attached to the rotating portion 22 of the bearing assembly 12 with a bearing attachment 36. They are attached such that the sealing elements 26 extend downward in series from the bearing assembly 12 and rotate with the rotating tubing string 24. Bearing attachment 36 has an attachment on the outer surface that is sized and shaped similar to second end 40 of sleeve 32 such that it allows sleeve 32, and therefore the stack of sealing elements 26, to attach to bearing attachment 36.

Referring to FIG. 2, there may be at least one sealing element 26 with a different inner sealing diameter 42 than another sealing element 26. This allows the user to provide multiple sealing diameters to seal against different sizes of tubular bodies that may extend through sealing assembly 10.

In the preferred embodiment, the sealing assembly 10 has sensors 50 (not shown) for sensing conditions within chambers 34. Sensors may sense, for example, pressure, temperature or others. There may be one sensor for each condition sensed, or a sensor that senses multiple conditions. Sensors 50 can be carried by sealing elements 26, but may also be carried by sleeves 32. Preferably, there is a sensor 50 for each chamber 34, although the number of sensors and the chambers in which they are positioned may be determined by the user. There may also be sensors positioned to determine conditions within riser 14 outside sealing assembly 10. Preferably, sensors 50 transmit the readings wirelessly although they may be connected to transmit along a wired connection. To reduce the power and design requirements of sensors 50, bearing assembly 12 may have a communication module (not shown) that receives the signals from sensors 50 and transmits the readings to surface, either wirelessly or using a wired connection.

Operation:

After the creation of a wellbore by any known method, a riser 14 is inserted into the wellbore. The riser 14 carries a latching assembly 18. Port 16 of riser 14 is connected to a conduit allowing for fluids to be pumped out from the wellbore. Next the sealing assembly may be assembled.

Referring to FIG. 2, sealing assembly 10 is assembled by attaching sealing elements 26 together using sleeves 32.

Each sleeve 32 has a first end 38 and a second end 40. The first end 38 of the first sealing element 26 in the stack of sealing elements will be connected to bearing attachment 36. This first sealing element 26 will be sized to attach to the exterior of bearing assembly 12, using a pin connector going through first end 38 and bearing attachment 36. In turn, bearing attachment 36 is attached to bearing assembly 12 using pin connectors. First end 38 preferably has a seal 33 at the first end 38, which when the pin connector attaches the first sealing element 26 to bearing attachment 36 will create a seal between first sealing element 26 and bearing assembly 12. The second end 40 of the first sleeve 32 will have an opening sized to receive another pin connector, and will also carry a seal 33. Additional sealing elements 26 are attached to the opening at the second end of the sleeve 32 which was attached prior. A sealing element 26 that is attached to the second end 40 of another sleeve 32 will carry a pin connector that will form a connection to attach the second end 40 of the prior sleeve 32 to the first end 38 of the new sleeve 32. Seals 33 on the first end 38 and the second end 40 will meet each other and form a sealed connection such that chamber 34 will be sealed from the exterior of the sealing assembly 10. Sealing assembly 10 will be formed by nesting together successive sealing elements 26 using pin connections and seals until the sealing assembly has reached the desired length. The final second end 40 will not receive an additional sleeve 32 to attach to the opening which would receive a pin connection, and will instead receive a cap ring 44 which also carries a pin connection to be attached to the final sealing element 26 at the second end 40 of the final sleeve 32. This will finish the sealing assembly 10.

Referring to FIGS. 2 and 4, the sealing assembly 10 which is attached to the rotating portion 22 at the bottom of the bearing assembly 12, can now be introduced into the wellbore. The sealing assembly 10 and bearing assembly 12 are together inserted into riser 14 and supported within riser 14 by latch assembly 18. The bearing assembly 12 is latched into place on the fixed portion 20 of bearing assembly 12 using latch assembly 18.

Once the bearing and sealing assemblies are in place, a tubular body is then inserted through bearing assembly 12 and sealing assembly 10. In the shown embodiment, a rotating tubing string such as 24 enters the bearing assembly 12 and the sealing assembly 10. As the rotating tubing string 24 is pushed through each sealing body 26, the sealing body 26 seals about the rotating tubing string 24 such that the sealing elements 26 will rotate with the rotating tubing string 24 due to the bearing assembly 12.

Referring to FIG. 2, the sealing assembly 10 may have sealing elements 26 with different inner sealing diameters 42. In this case, when the tubular body is inserted through the sealing elements, only those sealing elements with a sufficiently small inner sealing diameter will seal against the tubular body. This will allow for tubular bodies with different diameters to be used within the same sealing assembly 10.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A sealing assembly for a bearing assembly, the bearing assembly having a fixed portion attached to a riser of a wellhead and a rotating portion attached to a rotating tubing string that extends through the riser, the sealing assembly comprising:
   a plurality of sleeves, each sleeve of the plurality of sleeves removably connected to a corresponding sealing element of a plurality of sealing elements each formed of a sealing portion carried by a rigid attachment portion having an outwardly extending end, each sealing portion having an inner sealing surface designed to seal against a tubular body, the plurality of sleeves sequentially connected in a stacked arrangement wherein a plurality of chambers is formed by the plurality of sleeves and the plurality of sealing elements, wherein each sleeve of the plurality of sleeves has a first end and a second end with the second end sized to nest directly within the first end of an adjacent sleeve of the plurality of sleeves, such that nested sleeves connect to each other and connect to and cover the outwardly extending end of the rigid attachment portion adjacent thereto in a parallel arrangement, wherein each sleeve of the plurality of sleeves is a single piece sleeve and the rigid attachment portion is separate from the single piece sleeve; and
   a bearing attachment connecting a first and upper sealing element of the plurality of sealing elements to the rotating portion of the bearing assembly such that the plurality of sealing elements extends downward in series from the bearing assembly and rotates with the rotating tubing string.

2. The sealing assembly of claim 1, wherein at least one sealing element of the plurality of sealing elements has a first end and a second end, the first end being attached to a corresponding sleeve of the plurality of sleeves, and wherein the inner sealing surface is positioned toward the second end.

3. The sealing assembly of claim 1, wherein each sealing element of the plurality of sealing elements defines an inner sealing diameter.

4. The sealing assembly of claim 1, wherein at least one sealing element of the plurality of sealing elements has a different inner sealing diameter than another of the sealing elements.

5. The sealing assembly of claim 1, wherein each sleeve of the plurality of sleeves attaches to a first end of one of the sealing elements.

6. The sealing assembly of claim 1, further comprising a cap ring that engages the second end of a bottom sleeve of the plurality of sleeves.

7. The sealing assembly of claim 1, wherein each sealing element of the plurality of sealing elements comprises a rigid attachment portion for attaching to a sleeve of the plurality of sleeves and an elastomeric sealing portion that is carried by the attachment portion.

8. The sealing assembly of claim 1, further comprising at least one sensor for sensing at least one of pressure and temperature within at least one chamber of the plurality of chambers.

9. The sealing assembly of claim 8, wherein the at least one sensor transmits data from the at least one sensor wirelessly.

10. The sealing assembly of claim 1, wherein each sealing element of the plurality of sealing elements carries a sensor for sensing at least one of pressure and temperature.

11. The sealing assembly of claim 10, wherein each sensor transmits data from the sensor wirelessly.

* * * * *